US012066789B2

(12) United States Patent
Noguchi et al.

(10) Patent No.: US 12,066,789 B2
(45) Date of Patent: Aug. 20, 2024

(54) METHOD FOR PRODUCING TONER FOR DEVELOPING ELECTROSTATIC CHARGE IMAGE, TONER FOR DEVELOPING ELECTROSTATIC CHARGE IMAGE, AND ELECTROSTATIC CHARGE IMAGE DEVELOPER

(71) Applicant: FUJIFILM Business Innovation Corp., Tokyo (JP)

(72) Inventors: Daisuke Noguchi, Kanagawa (JP); Atsushi Sugawara, Kanagawa (JP); Yuji Isshiki, Kanagawa (JP); Hiroshi Nakazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 157 days.

(21) Appl. No.: 17/398,149

(22) Filed: Aug. 10, 2021

(65) Prior Publication Data

US 2022/0299895 A1 Sep. 22, 2022

(30) Foreign Application Priority Data

Mar. 19, 2021 (JP) ................................ 2021-046473

(51) Int. Cl.
*G03G 9/08* (2006.01)

(52) U.S. Cl.
CPC ......... *G03G 9/0804* (2013.01); *G03G 9/0815* (2013.01)

(58) Field of Classification Search
CPC .................................................... G03G 9/0804
See application file for complete search history.

(56) References Cited

U.S. PATENT DOCUMENTS

2003/0054280 A1* 3/2003 Ishihara ............... G03G 9/0821 430/124.1
2004/0018441 A1* 1/2004 Maric ...................... C08J 3/215 523/333
2004/0058267 A1* 3/2004 Ishiyama ........... G03G 9/08782 430/110.2
2011/0143274 A1* 6/2011 Iftime ................ G03G 9/08755 430/108.4

FOREIGN PATENT DOCUMENTS

JP 2016173568 A * 9/2016 ............... G03G 9/08
JP 2019-008042 A 1/2019

OTHER PUBLICATIONS

JP-2016173568-A Translation (Year: 2023).*

* cited by examiner

*Primary Examiner* — Peter L Vajda
*Assistant Examiner* — Charles Collins Sullivan, IV
(74) *Attorney, Agent, or Firm* — Sughrue Mion, PLLC

(57) ABSTRACT

A method for producing a toner for developing an electrostatic charge image includes: mixing at least one flocculant into a liquid dispersion containing binder-resin particles by adding the flocculant into the liquid dispersion containing binder-resin particles while circulating the liquid dispersion containing binder-resin particles between a stirring vessel and a disperser that applies a mechanical shear force; forming aggregated particles by heating the liquid dispersion with the flocculant therein after reducing the viscosity of the liquid dispersion; and forming toner particles by heating the liquid dispersion containing the aggregated particles and thereby making the aggregated particles fuse and coalesce.

20 Claims, 1 Drawing Sheet

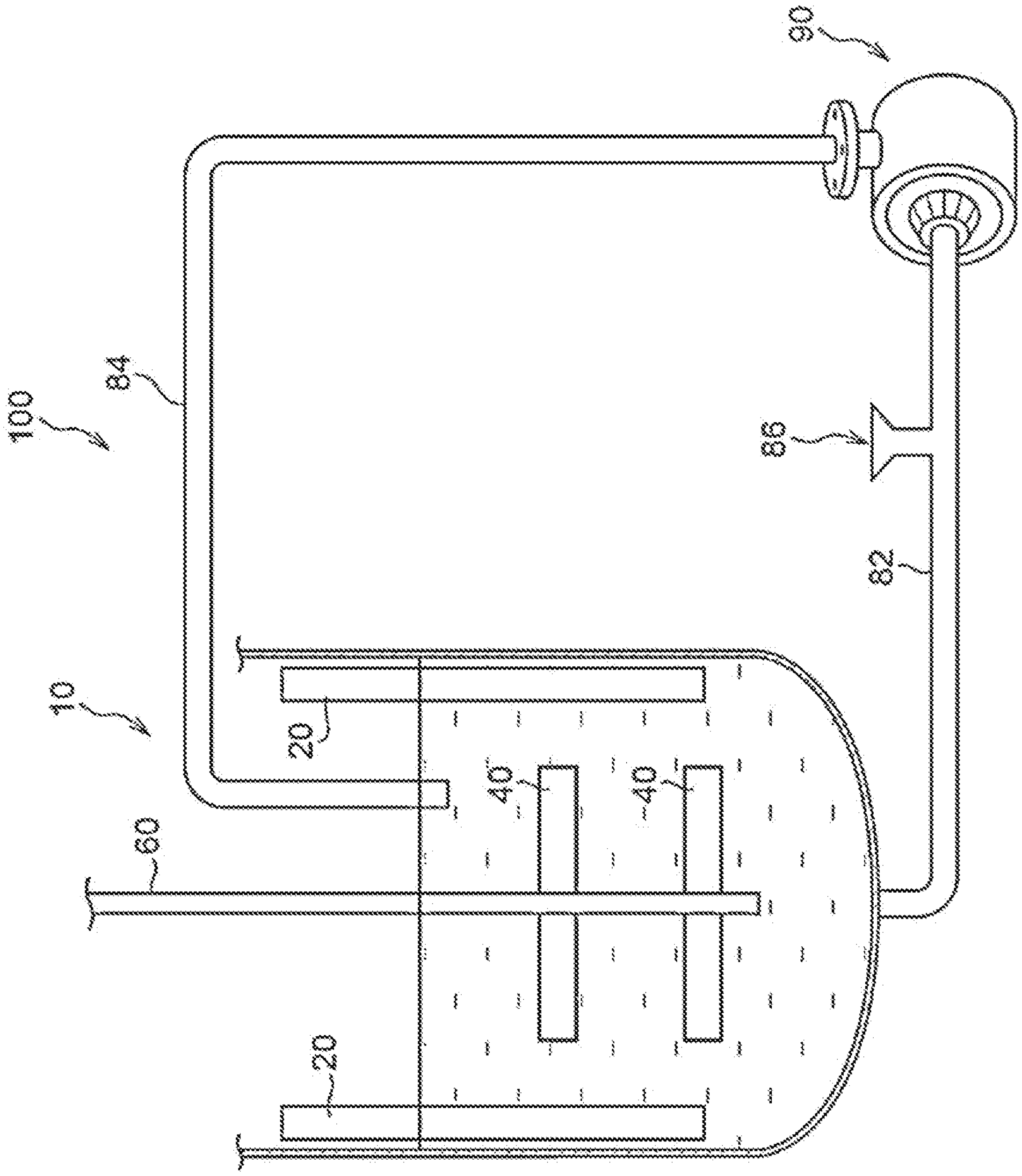
90
84
100
86
82
10
20
40
40
60
20

METHOD FOR PRODUCING TONER FOR DEVELOPING ELECTROSTATIC CHARGE IMAGE, TONER FOR DEVELOPING ELECTROSTATIC CHARGE IMAGE, AND ELECTROSTATIC CHARGE IMAGE DEVELOPER

CROSS-REFERENCE TO RELATED APPLICATIONS

This application is based on and claims priority under 35 USC 119 from Japanese Patent Application No. 2021-046473 filed Mar. 19, 2021.

BACKGROUND

(i) Technical Field

The present disclosure relates to a method for producing a toner for developing an electrostatic charge image, a toner for developing an electrostatic charge image, and an electrostatic charge image developer.

(ii) Related Art

Japanese Unexamined Patent Application Publication No. 2019-008042 discloses a method for producing toner. The method includes stirring an aggregation solution having a viscosity of 1 Pa·s or more at a shear rate of 10 $s^{-1}$ and having a thixotropic index of 7 or more. The stirring of the aggregation solution is with impellers on multiple shafts, with 50% by volume or less of the solution stirred at a shear rate of 10 $s^{-1}$ or less and 1% by volume or less at 400 $s^{-1}$ or more.

SUMMARY

Aspects of non-limiting embodiments of the present disclosure relate to a method for producing a toner for developing an electrostatic charge image. This method may help reduce oversized toner in the finished toner compared with a method in which aggregated particles are formed by heating a flocculant-containing liquid dispersion without reducing the viscosity of the liquid dispersion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a toner for developing an electrostatic charge image, the method including: mixing at least one flocculant into a liquid dispersion containing binder-resin particles by adding the flocculant into the liquid dispersion containing binder-resin particles while circulating the liquid dispersion containing binder-resin particles between a stirring vessel and a disperser that applies a mechanical shear force; forming aggregated particles by heating the liquid dispersion with the flocculant therein after reducing viscosity of the liquid dispersion; and forming toner particles by heating the liquid dispersion containing the aggregated particles and thereby making the aggregated particles fuse and coalesce.

BRIEF DESCRIPTION OF THE DRAWINGS

Exemplary embodiments of the present disclosure will be described in detail based on the following FIGURE, wherein:

The FIGURE is a schematic view of an exemplary structure of a circulating reactor for a method according to an exemplary embodiment for producing toner.

DETAILED DESCRIPTION

The following describes exemplary embodiments of the present disclosure. The following description and Examples are merely examples of the exemplary embodiments and do not limit the scope of the exemplary embodiments.

Numerical ranges specified with "A-B," "between A and B," "(from) A to B," etc., herein represent inclusive ranges, which include the minimum A and the maximum B as well as all values in between.

The following description also includes series of numerical ranges. In such a series, the upper or lower limit of a numerical range may be substituted with that of another in the same series. The upper or lower limit of a numerical range, furthermore, may be substituted with a value indicated in the Examples section.

A gerund or action noun used in relation to a certain process or method herein does not always represent an independent action. As long as its purpose is fulfilled, the action represented by the gerund or action noun may be continuous with or part of another.

An ingredient herein may be a combination of multiple substances. If a composition described herein contains a combination of multiple substances as one of its ingredients, the amount of the ingredient represents the total amount of the substances in the composition unless stated otherwise.

An ingredient herein, furthermore, may be a combination of multiple kinds of particles. If a composition described herein contains a combination of multiple kinds of particles as one of its ingredients, the particle diameter of the ingredient is that of the mixture of the multiple kinds of particles present in the composition.

As used herein, the term "(meth)acrylic" refers to at least one of acrylic or methacrylic, and "(meth)acrylate" refers to at least one of an acrylate or a methacrylate.

As used herein, the term "toner" refers to toner for developing an electrostatic charge image, "developer" refers to an electrostatic charge image developer, and "carrier" refers to a carrier for developing an electrostatic charge image.

In the present disclosure, the process of producing toner particles by causing particles of the materials to aggregate and coalesce in a solvent is referred to as emulsion aggregation (EA).

Method for Producing a Toner for Developing an Electrostatic Charge Image

A method according to an exemplary embodiment for producing toner is one that includes EA production of toner particles. The method includes the following.

Mixing at least one flocculant into a liquid dispersion containing binder-resin particles by adding the flocculant into the liquid dispersion containing binder-resin particles while circulating the liquid dispersion containing binder-resin particles between a stirring vessel and a disperser that applies a mechanical shear force (flocculant mixing);

- forming aggregated particles by heating the liquid dispersion with the flocculant therein after reducing the viscosity of the liquid dispersion (aggregation); and
- forming toner particles by heating the liquid dispersion containing the aggregated particles and thereby making the aggregated particles fuse and coalesce (coalescence)

In the method according to this exemplary embodiment for producing toner, the binder-resin particles may start aggregation as early as while the flocculant is being mixed into the liquid dispersion. In that case, the formation of aggregated particles is by promoting the growth of aggregates.

In the present disclosure, a reactor having a stirring vessel and a disperser that applies a mechanical shear force and structured to circulate the contents between the stirring vessel and the disperser is referred to as a "circulating reactor."

EA toner particles can be produced with a relatively narrow size distribution for example by adding a flocculant to a liquid dispersion of the particles of the materials and mixing and dispersing them to high uniformity. A possible approach is to mix and disperse the flocculant and the particles of the materials by circulating the liquid dispersion in a circulating reactor and applying a mechanical shear force to the liquid dispersion with the disperser at the same time. The application of a mechanical shear force to the liquid dispersion may be efficient when the liquid dispersion is relatively viscous.

After this, however, the liquid dispersion may be heated to form aggregated particles. If the liquid dispersion is highly viscous, the aggregated particles do not mix well in the stirring vessel, and some of them overgrow to a large particle size. The finished toner will therefore contain oversized toner.

To address this, the method according to this exemplary embodiment for producing toner includes reducing the viscosity of the liquid dispersion before heating the liquid dispersion to form aggregated particles. The liquid dispersion is not too viscous when heated, ensuring that the aggregated particles mix well and do not overgrow. This may help reduce oversized toner in the finished toner.

In this exemplary embodiment, the viscosity of the liquid dispersion is that at a shear rate of 1/s measured on a sample of the liquid dispersion at a sample temperature of 25° C. The details of the measurement of the viscosity of the liquid dispersion are as follows.

A rotary viscometer is used, such as Brookfield's R/S+ Rheometer (CP-75-1 spindle). The rotary viscometer is placed under 25° C. and 55% RH conditions. A sample of the liquid dispersion is collected multiple times to check the viscosity of the liquid dispersion over time.

The sample is 3 g of the liquid dispersion conditioned to a temperature of 25° C. The shear rate ($s^{-1}$) is increased from 0.5/s to 12/s with increments of 0.2 per second and then decreased in the same range with the same decrements, and the shear stress (Pa) is measured every 2 seconds. Viscosity (Pa·s), which is determined from shear stress (Pa) and the shear rate ($s^{-1}$), is plotted versus the shear rate, the common logarithm of the shear rate ($s^{-1}$) on the horizontal axis and that of viscosity on the vertical axis. The changes in viscosity are approximated by a straight line for increasing and decreasing shear rates. On each of the straight lines drawn, the viscosity (Pa·s) at 1/s (common logarithm of the shear rate=0) is determined from the common logarithm of the viscosity at 1/s (intercept). The two viscosity values are averaged. The same measurement is repeated three times, and the overall average is the viscosity (Pa·s) at a shear rate of 1/s.

In the formation of aggregated particles, the reduction of the viscosity of the liquid dispersion can be achieved by any method. Examples include adding water and adding a surfactant.

The FIGURE illustrates an example of a circulating reactor that may be used. The size of elements in the drawing is conceptual; the relative sizes of the elements do not need to be as illustrated.

The circulating reactor 100 illustrated in the FIGURE has a stirring vessel 10 and a disperser 90. The stirring vessel 10 and the disperser 90 are connected by tubes 82 and 84.

The stirring vessel 10 has baffles 20 and paddle impellers 40. Two, three, or four flat-plate or cylindrical baffles 20 are equally spaced along the inner wall of the stirring vessel 10, and two paddle impellers 40 are at different heights on a rotary shaft 60.

The disperser 90 has an internal mechanism by which it applies a mechanical shear force.

The tube 82 connects the bottom of the stirring vessel 10 and the inlet of the disperser 90. At the joint between the stirring vessel 10 and the tube 82, there is a valve (not illustrated).

The tube 82 also has an opening 86 for material loading. The opening 86 is used to load the flocculant and water and/or surfactant(s).

The tube 84 connects the outlet of the disperser 90 and the top of the stirring vessel 10. An end of the tube 84 is in a liquid dispersion contained in the stirring vessel 10.

To mix in the flocculant, a liquid dispersion containing binder-resin particles is circulated between the stirring vessel 10 and the disperser 90 while the rotation of the paddle impellers 40 and the operation of the disperser 90 are continued. The liquid dispersion containing binder-resin particles goes out of the stirring vessel 10 through its bottom, flows through the tube 82, and enters the disperser 90. Then the liquid dispersion containing binder-resin particles goes out of the disperser 90, flows through the tube 84, and enters the stirring vessel 10. While the liquid dispersion containing binder-resin particles is circulating, the flocculant is added through the opening 86. The circulation of the liquid dispersion containing binder-resin particles is continued to mix the flocculant into the liquid dispersion.

The valve at the joint between the stirring vessel 10 and the tube 82 is closed thereafter.

To form aggregated particles, water, for example, is loaded through the opening 86 while the rotation of the paddle impellers 40 is continued. The water loaded through the opening 86 is routed to the stirring vessel 10 through the disperser 90 and the tube 84 and mixed into the liquid dispersion contained in the stirring vessel 10. Then the liquid dispersion in the stirring vessel 10 is heated.

To form toner particles, the liquid dispersion in the stirring vessel 10 is heated while the rotation of the paddle impellers 40 is continued.

The following describes the method according to this exemplary embodiment for producing toner and materials used therein in detail.

Flocculant Mixing

At least one flocculant is mixed into a liquid dispersion containing binder-resin particles by adding the flocculant into the liquid dispersion containing binder-resin particles while circulating the liquid dispersion containing binder-resin particles between a stirring vessel and a disperser that applies a mechanical shear force. The liquid dispersion to be mixed with the flocculant contains at least binder-resin particles, optionally with release-agent particles and/or coloring-agent particles.

The liquid dispersion to be mixed with the flocculant can be produced by, for example, preparing the following liquid dispersions separately and mixing them together: a liquid dispersion of resin particles, which contains particles of a binder resin; a liquid dispersion of release-agent particles, which contains particles of a release agent; and a liquid dispersion of coloring-agent particles, which contains particles of a coloring agent. The mixing of the liquid dispersions of particles can be in any order.

In the following, what applies to all of the liquid dispersions of resin particles, release-agent particles, and coloring-agent particles is described collectively by referring to them as "the liquid dispersions of particles."

An exemplary embodiment of the liquid dispersions of particles is liquid dispersions obtained by dispersing the materials in particulate form in a dispersion medium using a surfactant.

The dispersion medium for the liquid dispersions of particles may be an aqueous medium. Examples of aqueous dispersion media include water and alcohols. If water is used, its ionic content may be reduced in advance, for example by distillation or deionization. One such aqueous medium may be used alone, or two or more may be used in combination.

The surfactant used to disperse the materials in the dispersion medium may be an anionic, cationic, or nonionic surfactant. Examples include anionic surfactants such as sulfates, sulfonates, phosphates, and soap surfactants; cationic surfactants such as amine salts and quaternary ammonium salts; and nonionic surfactants such as polyethylene glycol surfactants, ethylene oxide adducts of alkylphenols, and polyhydric alcohols. One surfactant may be used alone, or two or more may be used in combination. A combination of a nonionic surfactant with an anionic or cationic surfactant may also be used.

The dispersion of the materials in particulate form in the dispersion medium can be carried out by known dispersion techniques, such as the use of a rotary-shear homogenizer or a ball mill, sand mill, Dyno-Mill, or other medium mill.

As for the resin, it may be dispersed in particulate form in the dispersion medium by, for example, phase inversion emulsification. In phase inversion emulsification, the resin is first dissolved in a hydrophobic organic solvent in which the resin is soluble. The resulting organic continuous phase (O phase) is neutralized with a base, and then an aqueous medium (W phase) is added. This converts the resin emulsion from the W/O to O/W form, thereby dispersing the resin in particulate form in the aqueous medium.

In the liquid dispersions of particles, the volume-average diameter of the dispersed particles may be 30 nm or more and 300 nm or less, preferably 50 nm or more and 250 nm or less, more preferably 80 nm or more and 200 nm or less.

The volume-average diameter of particles dispersed in the liquid dispersions of particles can be determined by measuring the size distribution of the particles using a laser-diffraction particle size distribution analyzer (e.g., HORIBA LA-700). The particle diameter at which the cumulative volume from the smallest diameter is 50% is the volume-average diameter of the particles.

In the liquid dispersions of particles, the percentage of the particles may be 5% by mass or more and 50% by mass or less, preferably 10% by mass or more and 40% by mass or less, more preferably 15% by mass or more and 30% by mass or less.

Binder Resin

Examples of binder resins include vinyl resins that are homopolymers of monomers such as styrenes (e.g., styrene, para-chlorostyrene, and α-methylstyrene), (meth)acrylates (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenic unsaturated nitriles (e.g., acrylonitrile and methacrylonitrile), vinyl ethers (e.g., vinyl methyl ether and vinyl isobutyl ether), vinyl ketones (e.g., vinyl methyl ketone, vinyl ethyl ketone, and vinyl isopropenyl ketone), and olefins (e.g., ethylene, propylene, and butadiene) or copolymers of two or more such monomers.

Non-vinyl resins, such as epoxy resins, polyester resins, polyurethane resins, polyamide resins, cellulose resins, polyether resins, and modified rosin, mixtures of any such resin and vinyl resin(s), and graft copolymers obtained by polymerizing a vinyl monomer in the presence of any such non-vinyl resin may also be used.

One such binder resin may be used alone, or two or more may be used in combination.

A binder resin may be a polyester resin.

Examples of polyester resins include amorphous polyester resins and crystalline polyester resins.

In this exemplary embodiment, a "crystalline" polyester resin means that the endothermic profile of the resin as measured by differential scanning calorimetry (DSC) is not stepwise but has a clear peak, specifically a peak with a half width of 10° C. or narrower in DSC performed at a temperature elevation rate of 10° C./min.

The DSC endothermic profile of an "amorphous" polyester resin in this exemplary embodiment, by contrast, is stepwise or has no clear peak, or has a peak with a half width boarder than 10° C. under the same conditions.

Amorphous Polyester Resin

An amorphous polyester resin may be a commercially available one or may be a synthesized one.

An example of an amorphous polyester resin is an polycondensate of a polycarboxylic acid and a polyhydric alcohol.

Examples of polycarboxylic acids as one of the monomers from which the amorphous polyester resin can be polymerized include aliphatic dicarboxylic acids (e.g., oxalic acid, malonic acid, maleic acid, fumaric acid, citraconic acid, itaconic acid, glutaconic acid, succinic acid, alkenylsuccinic acids, adipic acid, and sebacic acid), aromatic dicarboxylic acids (e.g., terephthalic acid, isophthalic acid, phthalic acid, and naphthalenedicarboxylic acid), and anhydrides and lower-alkyl (e.g., C1-5 alkyl) esters thereof. Of these, aromatic dicarboxylic acids, for example, are preferred.

A combination of a dicarboxylic acid and a crosslinked or branched carboxylic acid having three or more carboxylic groups may also be used. Examples of carboxylic acids having three or more carboxylic groups include trimellitic acid, pyromellitic acid, and anhydrides and lower-alkyl (e.g., C1-5 alkyl) esters thereof.

One polycarboxylic acid may be used alone, or two or more may be used in combination.

Examples of polyhydric alcohols as one of the monomers from which the amorphous polyester resin can be polymerized include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexanedimethanol, and hydrogenated bisphenol A), and aromatic diols (e.g., ethylene oxide adducts of bisphenol A and propylene oxide adducts of bisphenol A). Of these, aromatic diols and alicyclic diols, for example, are preferred, and aromatic diols are more preferred.

A combination of a diol and a crosslinked or branched polyhydric alcohol having three or more hydroxyl groups may also be used. Examples of polyhydric alcohols having three or more hydroxyl groups include glycerol, trimethylolpropane, and pentaerythritol.

One polyhydric alcohol may be used alone, or two or more may be used in combination.

The glass transition temperature (Tg) of the amorphous polyester resin may be 50° C. or more and 80° C. or less, preferably 50° C. or more and 65° C. or less.

This glass transition temperature is that determined from the DSC curve of the resin, which is measured by differential scanning calorimetry (DSC). More specifically, this glass transition temperature is the "extrapolated initial temperature of glass transition" as in the methods for determining glass transition temperatures set forth in JIS K7121: 1987 "Testing Methods for Transition Temperatures of Plastics."

The weight-average molecular weight (Mw) of the amorphous polyester resin may be 5000 or more and 1000000 or less, preferably 7000 or more and 500000 or less.

The number-average molecular weight (Mn) of the amorphous polyester resin may be 2000 or more and 100000 or less.

The molecular weight distribution, Mw/Mn, of the amorphous polyester resin may be 1.5 or more and 100 or less, preferably 2 or more and 60 or less.

These weight- and number-average molecular weights are those measured by gel permeation chromatography (GPC). The analyzer is Tosoh's HLC-8120 GPC chromatograph with Tosoh's TSKgel SuperHM-M column (15 cm), and the eluate is tetrahydrofuran (THF). Comparing the measured data with a molecular-weight calibration curve prepared using monodisperse polystyrene standards gives the weight- and number-average molecular weights.

As for production, the amorphous polyester resin can be produced by known methods. A specific example is to polymerize the raw materials at a temperature of 180° C. or more and 230° C. or less. The pressure in the reaction system may optionally be reduced to remove the water and alcohol that are produced as condensation proceeds.

If the raw-material monomers do not dissolve or are not miscible together at the reaction temperature, a high-boiling solvent may be added as a solubilizer to make the monomers dissolve. In that case, the solubilizer is removed by distillation during the polycondensation. Any monomer not miscible with the other(s) may be condensed with the planned counterpart acid(s) or alcohol(s) before the polycondensation process.

Crystalline Polyester Resin

A crystalline polyester resin may be a commercially available one or may be a synthesized one.

An example of a crystalline polyester resin is a polycondensate of a polycarboxylic acid and a polyhydric alcohol. Crystalline polyester resins made with linear aliphatic polymerizable monomers have greater potential to form a crystal structure than those made with aromatic polymerizable monomers.

Examples of polycarboxylic acids as one of the monomers from which the crystalline polyester resin can be polymerized include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids, such as phthalic acid, isophthalic acid, terephthalic acid, and naphthalene-2,6-dicarboxylic acid), and anhydrides and lower-alkyl (e.g., C1-5 alkyl) esters thereof.

A combination of a dicarboxylic acid and a crosslinked or branched carboxylic acid having three or more carboxylic groups may also be used. Examples of carboxylic acids having three or more carboxylic groups include aromatic carboxylic acids (e.g., 1,2,3-benzenetricarboxylic acid, 1,2,4-benzenetricarboxylic acid, and 1,2,4-naphthalenetricarboxylic acid) and anhydrides and lower-alkyl (e.g., C1-5 alkyl) esters thereof.

A combination of a dicarboxylic acid such as listed above and a dicarboxylic acid having a sulfonic acid group or an ethylenic double bond may also be used.

One polycarboxylic acid may be used alone, or two or more may be used in combination.

As for the polyhydric alcohol, examples include aliphatic diols (e.g., C7-20 linear aliphatic diols). Examples of aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. 1,8-Octanediol, 1,9-nonanediol, and 1,10-decanediol are preferred.

A combination of a diol and a crosslinked or branched alcohol having three or more hydroxyl groups may also be used. Examples of alcohols having three or more hydroxyl groups include glycerol, trimethylolethane, trimethylolpropane, and pentaerythritol.

One polyhydric alcohol may be used alone, or two or more may be used in combination.

Release Agent

Examples of release agents include hydrocarbon waxes; natural waxes, such as carnauba wax, rice wax, and candelilla wax; synthesized or mineral/petroleum waxes, such as montan wax; and ester waxes, such as fatty acid esters and montanates. Other release agents may also be used.

The melting temperature of the release agent may be 50° C. or more and 110° C. or less, preferably 60° C. or more and 100° C. or less.

The melting temperature of the release agent is the "peak melting temperature" of the agent as in the methods for determining melting temperatures set forth in JIS K7121: 1987 "Testing Methods for Transition Temperatures of Plastics" and is determined from the DSC curve of the agent, which is measured by differential scanning calorimetry (DSC).

Coloring Agent

Examples of coloring agents include pigments, such as carbon black, chrome yellow, Hansa yellow, benzidine yellow, threne yellow, quinoline yellow, pigment yellow, permanent orange GTR, pyrazolone orange, Vulcan orange, Watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, Calco oil blue, methylene blue chloride, phthalocyanine blue, pigment blue, phthalocyanine green, and malachite green oxalate; and dyes, such as acridine, xanthene, azo, benzoquinone, azine, anthraquinone, thioindigo, dioxazine, thiazine, azomethine, indigo, phthalocyanine, aniline black, polymethine, triphenylmethane, diphenylmethane, and thiazole dyes. One coloring agent may be used alone, or two or more may be used in combination.

Surface-treated coloring agents may optionally be used. A combination of a coloring agent and a dispersant may also be used.

A mixture of multiple liquid dispersions of particles is referred to as a "liquid dispersion mixture."

After the multiple liquid dispersions are mixed together, the pH of the liquid dispersion mixture may be adjusted to 3 or more and 4 or less. The pH of the liquid dispersion mixture can be adjusted by, for example, adding an acidic aqueous solution of nitric acid, hydrochloric acid, or sulfuric acid.

In the liquid dispersion mixture, the sets of particles may be present in any of the following ratios by mass.

If the liquid dispersion mixture contains release-agent particles, the ratio by mass between the binder-resin particles and the release-agent particles may be between 100:4 and 100:24 (binder-resin particles:release-agent particles), preferably between 100:8 and 100:22, more preferably between 100:12 and 100:20.

If the liquid dispersion mixture contains coloring-agent particles, the ratio by mass between the binder-resin particles and the coloring-agent particles may be between 100:4 and 100:24 (binder-resin particles:coloring-agent particles), preferably between 100:8 and 100:22, more preferably between 100:12 and 100:20.

Flocculant

Examples of flocculants include surfactants having the opposite polarity with respect to the surfactant in the liquid dispersion mixture, inorganic metal salts, and divalent or higher-valency metal complexes. One flocculant may be used alone, or two or more may be used in combination.

Examples of inorganic metal salts include metal salts such as calcium chloride, calcium nitrate, barium chloride, magnesium chloride, zinc chloride, aluminum chloride, and aluminum sulfate; and polymers of inorganic metal salts, such as polyaluminum chloride, polyaluminum hydroxide, and calcium polysulfide.

Divalent or higher-valency metal salt compounds may be used as flocculants. Trivalent metal salt compounds are preferred, and trivalent inorganic aluminum salt compounds are more preferred. Examples of trivalent inorganic aluminum salt compounds include aluminum chloride, aluminum sulfate, polyaluminum chloride, and polyaluminum hydroxide.

The amount of flocculant added is not critical. If the flocculant is a trivalent metal salt compound, the trivalent metal salt compound may be added in an amount of 0.5 parts by mass or more and 5.0 parts by mass or less, preferably 0.6 parts by mass or more and 4.0 parts by mass or less, more preferably 0.7 parts by mass or more and 3.0 parts by mass or less per 100 parts by mass of the binder resin.

The liquid dispersion containing at least binder-resin particles is circulated in a circulating reactor. This may help give the toner particles a relatively narrow size distribution.

The application of a mechanical shear force to the liquid dispersion may be efficient when the liquid dispersion has a relatively high viscosity. The viscosity of the liquid dispersion may be 25 Pa·s or more and 85 Pa·s or less, preferably 30 Pa·s or more and 80 Pa·s or less, more preferably 35 Pa·s or more and 75 Pa·s or less.

In addition, the viscosity of the liquid dispersion may stay constant or vary.

This viscosity is that at a shear rate of 1/s measured on a sample of the liquid dispersion at a sample temperature of 25° C.

The tip speed of the disperser that applies a mechanical shear force to the liquid dispersion may be 30 m/sec or more and 50 m/sec or less, with the proviso that the viscosity of the liquid dispersion is in any of the above ranges.

A viscosity of the liquid dispersion and a tip speed of the disperser in such ranges may help apply a shear force to the liquid dispersion efficiently.

Aggregation

Aggregated particles are formed by heating the liquid dispersion with the flocculant therein after reducing the viscosity of the liquid dispersion.

The binder-resin particles may have started aggregation while the flocculant was being mixed into the liquid dispersion. In that case, the formation of aggregated particles is by promoting the growth of aggregates.

The reduction of the viscosity of the liquid dispersion with the flocculant therein can be achieved by, for example, adding at least one of water or a surfactant to the liquid dispersion. The ionic content of the water may be reduced in advance, for example by distillation or deionization. If a surfactant is added, it may be of the same kind as that used to prepare the liquid dispersions of particles of the materials.

The amount of water or surfactant added is not critical. For example, the water or surfactant may be added to reduce the viscosity of the liquid dispersion with the flocculant therein by more than 5 Pa·s and less than 50 Pa·s.

This viscosity is that at a shear rate of 1/s measured on a sample of the liquid dispersion at a sample temperature of 25° C.

The decrease in the viscosity of the liquid dispersion with the flocculant therein may be more than 5 Pa·s and less than 50 Pa·s in view of the balance between the efficiency in the application of a shear force to the liquid dispersion and that in the formation of aggregated particles. Preferably, the viscosity is reduced by 8 Pa·s or more and 48 Pa·s or less, more preferably 10 Pa·s or more and 45 Pa·s or less.

This viscosity is that at a shear rate of 1/s measured on a sample of the liquid dispersion at a sample temperature of 25° C.

The temperature to which the liquid dispersion is heated is selected based on the glass transition temperature (Tg) of the binder-resin particles. For example, it may be (Tg of the binder-resin particles−30° C.) or more and (Tg of the binder-resin particles−5° C.) or less.

If the liquid dispersion contains multiple sets of binder-resin particles with different Tgs, the lowest one is the Tg in this context.

Second Aggregation

If the manufacturer wants to produce a core-shell toner, second aggregated particles may be formed.

The second aggregated particles are formed by mixing the liquid dispersion containing the aggregated particles and at least one liquid dispersion containing shell-layer resin particles together and causing the shell-layer resin particles to aggregate on the surface of the aggregated particles.

The liquid dispersion containing shell-layer resin particles may be at least one selected from the liquid dispersions of binder-resin particles for the formation of cores, preferably liquid dispersion(s) of particles of a polyester resin, more preferably liquid dispersion(s) of particles of an amorphous polyester resin.

The formation of second aggregated particles includes, for example:

adding the liquid dispersion of shell-layer resin particles to the liquid dispersion containing the aggregated particles while stirring the liquid dispersion containing the aggregated particles; and heating the liquid dispersion containing the aggregated particles with the liquid dispersion of shell-layer resin particles therein while stirring it.

The temperature to which the liquid dispersion containing the aggregated particles is heated is selected based on the glass transition temperature (Tg) of the shell-layer resin particles. For example, it may be (Tg of the shell-layer resin particles−30° C.) or more and (Tg of the shell-layer resin particles−5° C.) or less.

After the aggregated or second aggregated particles have grown to a predetermined size and before the heating for the formation of toner particles takes place, a chelating agent for the flocculant may be added to the liquid dispersion containing the aggregated or second aggregated particles to terminate the growth of the aggregated or second aggregated particles.

Examples of chelating agents include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

The amount of chelating agent added may be 0.01 parts by mass or more and 5.0 parts by mass or less, preferably 0.1 parts by mass or more and less than 3.0 parts by mass, per 100 parts by mass of the binder-resin particles.

After the aggregated or second aggregated particles have grown to a predetermined size and before the heating for the formation of toner particles takes place, the pH of the liquid dispersion containing the aggregated or second aggregated particles may be increased to terminate the growth of the aggregated or second aggregated particles.

An example of how to increase the pH of the liquid dispersion containing the aggregated or second aggregated particles is to add at least one selected from the group consisting of aqueous solutions of alkali hydroxides and aqueous solutions of alkaline earth hydroxides.

The target pH of the liquid dispersion containing the aggregated or second aggregated particles may be 8 or more and 10 or less.

Coalescence

Toner particles are formed by heating the liquid dispersion containing the aggregated particles and thereby making the aggregated particles fuse and coalesce.

If second aggregated particles are formed, the formation of toner particles is by heating the liquid dispersion containing the second aggregated particles and thereby making the second aggregated particles fuse and coalesce. This gives core-shell toner particles.

The configuration described below is common to both the aggregated and second aggregated particles.

The temperature to which the liquid dispersion containing the aggregated particles is heated may be equal to or higher than the glass transition temperature (Tg) of the binder resin. Specifically, it may be the Tg of the binder resin plus 10° C. to 35° C.

If the aggregated particles contain multiple binder resins with different Tgs, the highest one is the Tg in this context.

The toner particles formed in the liquid dispersion are then washed, separated, and dried by known methods to give dry toner particles. The washing may be carried out by sufficient replacement with deionized water in view of chargeability. The separation may be carried out by, for example, suction filtration or pressure filtration in view of productivity. The drying may be carried out by, for example, lyophilization, flash drying, fluidized drying, or vibrating fluidized drying in view of productivity.

Addition of External Additives

The method according to this exemplary embodiment for producing toner may include adding external additives to the toner particles.

The external additives are added to the toner particles by mixing dry toner particles and the external additives together, for example using a V-blender, Henschel mixer, or Lödige mixer. Oversized toner particles may optionally be removed, for example using a vibrating sieve or air-jet sieve.

An example of an external additive is inorganic particles. Examples of inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO\cdot SiO_2$, $K_2O\cdot(TiO_2)_n$, $Al_2O_3\cdot 2SiO_2$, $CaCO_3$, $MgCO_3$, $BaSO_4$, and $MgSO_4$.

The inorganic particles as an external additive may have a hydrophobic surface, for example created by immersion in a hydrophobizing agent. The hydrophobizing agent can be of any kind, but examples include silane coupling agents, silicone oil, titanate coupling agents, and aluminum coupling agents. One such agent may be used alone, or two or more may be used in combination.

The amount of hydrophobizing agent is usually, for example, 1 part by mass or more and 10 parts by mass or less per 100 parts by mass of the inorganic particles.

Materials like resin particles (particles of polystyrene, polymethyl methacrylate, melamine resins, etc.) and active cleaning agents (e.g., metal salts of higher fatty acids, typically zinc stearate, and particles of fluoropolymers) are also examples of external additives.

The percentage of the external additives may be 0.01% by mass or more and 5% by mass or less, preferably 0.01% by mass or less and 2.0% by mass or less, of the toner particles.

Toner

The toner produced by the production method according to this exemplary embodiment may be a toner with external additives, i.e., a toner obtained by adding external additives to toner particles. The configuration of the external additives is as described above.

The toner produced by the method according to this exemplary embodiment may be a single-layer toner or may be a core-shell toner, i.e., a toner having a core and a layer with which the core is coated (shell layer). A core-shell toner has, for example, a core containing a binder resin, a release agent, and a coloring agent and a shell layer containing a binder resin.

The binder resin content may be 40% by mass or more and 95% by mass or less of the toner particles as a whole. Preferably, the binder resin content is 50% by mass or more and 90% by mass or less, more preferably 60% by mass or more and 85% by mass or less.

The release agent content may be 1% by mass or more and 20% by mass or less of the toner as a whole. Preferably, the release agent content is 5% by mass or more and 15% by mass or less.

If the toner contains a coloring agent, the coloring agent content may be 1% by mass or more and 30% by mass or less of the toner as a whole. Preferably, the coloring agent content is 3% by mass or more and 15% by mass or less.

The volume-average particle diameter of the toner may be 2 μm or more and 10 μm or less, preferably 4 μm or more and 8 μm or less. The volume-average particle diameter of the toner can be measured as follows.

The particle size distribution of the toner is measured using Coulter Multisizer II (Beckman Coulter) and ISOTON-II electrolyte (Beckman Coulter). For measurement, a sample of the toner, 0.5 mg or more and 50 mg or less, is added to 2 ml of a 5% by mass aqueous solution of a surfactant as a dispersant (e.g., a sodium alkylbenzene sulfonate). The resulting dispersion is added to 100 ml or more and 150 ml or less of the electrolyte. The electrolyte with the suspended sample therein is sonicated for 1 minute using a sonicator, and the size distribution is measured on 50000 sampled particles within a diameter range of 2 μm to 60 μm using Coulter Multisizer II with an aperture size of 100 μm. The measured size distribution is plotted starting from the smallest diameter, and the particle diameter at which the cumulative volume is 50% is the volume-average particle diameter D50v.

The average roundness of the toner may be 0.94 or more and 1.00 or less, preferably 0.95 or more and 0.98 or less.

The average roundness of the toner is given by (the circumference of circles having the same area as projections of particles)/(the circumference of the projections of particles) and is measured on 3500 sampled particles using a flow particle-image analyzer (Sysmex FPIA-3000).

Developer

The toner produced by the production method according to this exemplary embodiment may be used as a one-component developer or may be used as a two-component developer by being mixed with a carrier.

The carrier can be of any kind and can be a known one. Examples include a coated carrier, formed by a core magnetic powder and a coating resin on its surface; a magnetic powder-dispersed carrier, formed by a matrix resin and a dispersed magnetic powder contained therein; and a resin-impregnated carrier, which is a porous magnetic powder impregnated with resin.

The particles as a component of a magnetic powder-dispersed or resin-impregnated carrier can serve as a core material. A carrier obtained by coating the surface of them with resin may also be used.

The magnetic powder can be, for example, a powder of a magnetic metal, such as iron, nickel, or cobalt; or a powder of a magnetic oxide, such as ferrite or magnetite.

The coating or matrix resin can be, for example, polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin (resin having organosiloxane bonds) or its modified form, a fluoropolymer, polyester, polycarbonate, a phenolic resin, or an epoxy resin. Electrically conductive particles or other additives may be contained in the coating or matrix resin. Examples of electrically conductive particles include particles of metal, such as gold, silver, or copper, and particles of carbon black, titanium oxide, zinc oxide, tin oxide, barium sulfate, aluminum borate, and potassium titanate.

The resin coating of the surface of the core material can be achieved by, for example, coating the surface with a coating-layer solution prepared by dissolving the coating resin and additives (optional) in a solvent. The solvent can be of any kind and is selected considering, for example, the kind of resin used and suitability for coating.

Specific examples of how to provide the resin coating include dipping, i.e., immersing the core material in the coating-layer solution; spraying, i.e., applying a mist of the coating-layer solution onto the surface of the core material; fluidized bed coating, i.e., applying a mist of the coating-layer solution to a core material floated on a stream of air; and kneader-coater coating, i.e., mixing the carrier core material and the coating-layer solution in a kneader-coater and then removing the solvent.

For a two-component developer, the mix ratio (by mass) between the toner and the carrier may be between 1:100 (toner:carrier) and 30:100, preferably between 3:100 and 20:100.

EXAMPLES

The following describes exemplary embodiments of the present disclosure in further detail by providing examples, but the exemplary embodiments of the present disclosure are not limited to these examples.

In the following description, "parts" and "%" are by mass unless stated otherwise.

The syntheses, treatments, production, etc., are carried out at room temperature (25° C.±3° C.) unless stated otherwise.

Production of Liquid Dispersions of Particles

Production of Liquid Dispersion of Amorphous Polyester Resin Particles (A)

Terephthalic acid: 690 parts
Fumaric acid: 310 parts
Ethylene glycol: 400 parts
1,5-Pentanediol: 450 parts These materials are put into a reactor equipped with a stirrer, a nitrogen inlet tube, a temperature sensor, and a rectifying column. With a nitrogen stream into the reactor, the temperature is increased to 220° C. over 1 hour. Ten parts of titanium tetraethoxide is added to a total of 1000 parts of the above materials. The temperature is increased to 240° C. over 0.5 hours with removal of water by distillation as it is formed. After 1 hour of dehydration condensation at 240° C., the reaction product is cooled. The resulting amorphous polyester resin, having a weight-average molecular weight of 96000 and a glass transition temperature of 59° C., is amorphous polyester resin (A).

In a vessel equipped with a temperature controller and a nitrogen purge system, 550 parts of ethyl acetate and 250 parts of 2-butanol are mixed together. Then 1000 parts of amorphous polyester resin (A) is dissolved in the resulting solvent mixture by adding the resin little by little. The resulting solution is stirred with a 10% aqueous solution of ammonia (in an amount equivalent to three times, by molar ratio, the acid value of the resin) for 30 minutes. After the reactor is purged with dry nitrogen, 4000 parts of deionized water is added dropwise with stirring at a maintained temperature of 40° C. to cause the mixture to emulsify. Then returning the resulting emulsion to 25° C. and removing the solvents under reduced pressure gives a liquid dispersion of resin particles in which resin particles having a volume-average diameter of 160 nm are dispersed. Deionized water is added to this liquid dispersion of resin particles to a solids content of 20%. The resulting liquid dispersion is liquid dispersion of amorphous polyester resin particles (A).

Production of Liquid Dispersion of Amorphous Polyester Resin Particles (B)

Terephthalic acid: 690 parts
Trimellitic acid: 310 parts
Ethylene glycol: 400 parts
1,5-Pentanediol: 450 parts These materials are put into a reactor equipped with a stirrer, a nitrogen inlet tube, a temperature sensor, and a rectifying column. With a nitrogen stream into the reactor, the temperature is increased to 220° C. over 1 hour. Ten parts of titanium tetraethoxide is added to a total of 1000 parts of the above materials. The temperature is increased to 240° C. over 0.5 hours with removal of water by distillation as it is formed. After 1 hour of dehydration condensation at 240° C., the reaction product is cooled. The resulting amorphous polyester resin, having a weight-average molecular weight of 127000 and a glass transition temperature of 59° C., is amorphous polyester resin (B).

A liquid dispersion of resin particles in which resin particles having a volume-average diameter of 160 nm are dispersed is obtained in the same way as in the production of liquid dispersion (A) of amorphous polyester resin particles, except that the 1000 parts of amorphous polyester resin (A) is changed to 1000 parts of amorphous polyester resin (B). Deionized water is added to this liquid dispersion of resin particles to a solids content of 20%. The resulting liquid dispersion is liquid dispersion (B) of amorphous polyester resin particles.

Production of a Liquid Dispersion of Crystalline Polyester Resin Particles (C)

1,10-Decanedicarboxylic acid: 2600 parts
1,6-Hexanediol: 1670 parts
Dibutyltin oxide (catalyst): 3 parts These materials are put into a reactor dried by heating. After the air in the reactor is replaced with nitrogen gas to create an inert atmosphere, the materials are stirred under reflux for 5 hours at 180° C. by mechanical stirring. Then the resulting mixture is heated to 230° C. gently and stirred for 2 hours under reduced pressure. The mixture that has become viscous is air-cooled to terminate the reaction, giving a crystalline polyester resin having a weight-average molecular weight of 12600 and a melting temperature of 73° C.

A mixture of 900 parts of the crystalline polyester resin, 18 parts of an anionic surfactant (TaycaPower, Tayca Corporation), and 2100 parts of deionized water is heated to 120° C., dispersed using a homogenizer (IKA's ULTRA- TURRAX T50), and then dispersed for 1 hour using a pressure-pump Gaulin homogenizer to give a liquid dispersion of resin particles in which resin particles having a volume-average diameter of 160 nm are dispersed. Adding deionized water to this liquid dispersion of resin particles to a solids content of 20% gives a liquid dispersion of crystalline polyester resin particles (C).

Production of a Liquid Dispersion of Styrene-Acrylic Resin Particles (S)

Styrene: 3750 parts
n-butyl acrylate: 250 parts
Acrylic acid: 20 parts
Dodecanethiol: 240 parts
Carbon tetrabromide: 40 parts An aqueous solution of surfactants is prepared by dissolving 60 parts of a nonionic surfactant (Sanyo Chemical Industries, Ltd.'s Nonipol 400) and 100 parts of an anionic surfactant (TaycaPower, Tayca Corporation) in 5500 parts of deionized water. The above polymerization materials are mixed together until dissolution, and the resulting mixture is dispersed and emulsified in the aqueous solution of surfactants. Then an aqueous solution of 40 parts of ammonium persulfate in 500 parts of deionized water is put into the reactor with stirring over 20 minutes. After nitrogen purging, the reactor is heated in an oil bath with stirring until the temperature of the contents reaches 70° C. Emulsion polymerization is continued by holding the temperature at 70° C. for 5 hours, giving a liquid dispersion of resin particles in which resin particles having a volume-average diameter of 160 nm are dispersed. Adding deionized water to this liquid dispersion of resin particles to a solids content of 20% gives a liquid dispersion of styrene-acrylic resin particles (S).

Production of a Liquid Dispersion of Release-Agent Particles (W)

A paraffin wax (Nippon Seiro Co., Ltd., FNP92; melting temperature, 92° C.): 1000 parts
An anionic surfactant (TaycaPower, Tayca Corporation): 10 parts
Deionized water: 3500 parts These materials are mixed together, and the resulting mixture is heated to 100° C. The mixture is dispersed using a homogenizer (IKA's ULTRA-TURRAX T50) and then using a pressure-pump Gaulin homogenizer, giving a liquid dispersion of release-agent particles in which release-agent particles having a volume-average diameter of 220 nm are dispersed. Adding deionized water to this liquid dispersion of release-agent particles to a solids content of 20% gives a liquid dispersion of release-agent particles (W).

Production of a Liquid Dispersion of Coloring-Agent Particles (C)

A cyan pigment (Pigment Blue 15:3, Dainichiseika Color & Chemicals Mfg.): 500 parts
An anionic surfactant (TaycaPower, Tayca Corporation): 50 parts
Deionized water: 1930 parts These materials are mixed together, and the resulting mixture is dispersed for 10 minutes at 240 MPa using an Ultimaizer (Sugino Machine) to give a liquid dispersion (C) of coloring-agent particles having a solids concentration of 20%.

Example 1

Preparation of a Circulating Reactor

A jacketed stirring vessel is prepared. The bottom of this stirring vessel is connected to a disperser (Pacific Machinery & Engineering's CAVITRON CD1010) via conduits and a circulating pump, and the conduit extending from the outlet of the disperser is immersed into the stirring vessel from above to complete a circulating reactor. An opening for material loading is created in the conduit that connects the bottom of the stirring vessel and the disperser.

Flocculant Mixing

Deionized water: 3500 parts
Liquid dispersion of amorphous polyester resin particles (A): 2630 parts
Liquid dispersion of amorphous polyester resin particles (B): 2630 parts
The liquid dispersion of crystalline polyester resin particles (C): 1500 parts
The liquid dispersion of styrene-acrylic resin particles (S): 750 parts
The liquid dispersion of release-agent particles (W): 1500 parts
The liquid dispersion of coloring-agent particles (C): 1500 parts These materials are put into the circulating reactor, and the pH is adjusted to 3.8 with 0.1 N nitric acid.

Twenty-five parts of aluminum sulfate is dissolved in 1500 parts of deionized water to give an aqueous solution of aluminum sulfate.

While the contents of the circulating reactor are circulated and at the same time stirred and dispersed, the aqueous solution of aluminum sulfate is added through the opening. The contents are then circulated and at the same time stirred and dispersed for 10 minutes, with their temperature kept at 30° C. The tip speed of the disperser of the circulating reactor is presented in Table 1. The viscosity of a sample of the liquid dispersion at the midpoint of the 10-minute circulation and that at the end of the 10-minute circulation ("viscosity A") are also presented in Table 1.

Aggregation

The disperser is stopped, and the valve at the bottom of the stirring vessel is closed. Then 1500 parts of deionized water is added through the opening, routed to the stirring vessel through the disperser and a conduit, and stirred and mixed into the liquid dispersion. The viscosity of a sample of the liquid dispersion after the stirring and mixing in of 1500 parts of deionized water ("viscosity B") is presented in Table 1.

Then the contents are heated to 45° C. and maintained at this temperature until the volume-average diameter of the aggregated particles is 4.0 μm while stirring is continued.

Second Aggregation

A mixture of 2250 parts of liquid dispersion of amorphous polyester resin particles (A) and 2250 parts of liquid dispersion of amorphous polyester resin particles (B) is put into the liquid dispersion containing aggregated particles. Second aggregated particles are formed by allowing the resulting mixture to stand for 30 minutes. Then the pH is adjusted to 9.0 with a 1 N aqueous solution of sodium hydroxide.

Coalescence

The stirring vessel is heated to 85° C. at a rate of 0.5° C./min, maintained at 85° C. for 3 hours, and then cooled to 30° C. at 15° C./min (first cooling) while the stirring of the contents is continued. Then the stirring vessel is heated to 55° C. at a rate of 0.2° C./min (reheating), maintained at this temperature for 30 minutes, and then cooled to 30° C. at 15° C./min (second cooling). Then the solids are isolated by filtration, washed with deionized water, and dried. The resulting toner particles, having a volume-average diameter of 5.0 μm, is toner particles (1).

Addition of an External Additive

One hundred parts of toner particles (1) and 1.5 parts of hydrophobic silica (Nippon Aerosil Co., Ltd.'s RY50) are mixed together and blended for 30 minutes at a rotational speed of 10000 rpm using a sample mill. The resulting mixture is sieved through a 45-μm mesh vibrating sieve. The resulting toner is toner (1). The volume-average particle diameter of toner (1) is 5.0 μm.

Production of a Carrier

Five hundred parts of spherical particles of magnetite (volume-average diameter, 0.55 μm) are stirred in a Henschel mixer and then stirred with 5.0 parts of a titanate coupling agent for 30 minutes at an increased temperature of 100° C. Then 500 parts of the magnetite particles treated with a titanate coupling agent is stirred in a four-neck flask with 6.25 parts of phenol, 9.25 parts of 35% formalin, 6.25 parts of 25% ammonia solution, and 425 parts of water and allowed to react for 120 minutes at 85° C. while stirring is continued. The reaction mixture is cooled to 25° C., and the precipitate is washed with water by adding 500 parts of water and removing the supernatant. The washed precipitate is dried by heating at reduced pressure, giving a carrier having an average particle diameter of 35 μm (CA).

Production of a Developer

Toner (1) and the carrier (CA) are put into a V-blender in a ratio of 5:95 (toner (1):carrier (CA); by mass) and stirred for 20 minutes. The resulting mixture is developer (1).

Examples 2 to 7 and Comparative Examples 1 and 2

Toner particles are obtained in the same way as in Example 1 except that the production parameters are changed as in Table 1. Then a developer is obtained by adding an external additive to the toner particles and mixing the particles with a carrier in the same way as in Example 1.

Performance Testing

Amounts of Oversized and Undersized Particles

Two milliliters of a 5% aqueous solution of a surfactant (sodium dodecylbenzenesulfonate) and 0.5 mg of the toner are added to 100 ml of ISOTON-II (Beckman Coulter) and dispersed using a sonicator for approximately 3 minutes. The resulting dispersion is used as a sample for measurement.

The diameter of particles in the sample is measured using Coulter Multisizer II (Beckman Coulter) with an aperture size of 100 μm.

Particles whose diameter is 10.5 μm or more are defined as oversized particles. Their percentage by volume is determined and classified as follows.

Particles whose diameter is 2.5 μm or less are defined as undersized particles. Their percentage by number is determined and classified as follows.

Oversized Particles

A: Oversized particles constitute less than 0.5% by volume

B: Oversized particles constitute 0.5% by volume or more and less than 2.5% by volume C: Oversized particles constitute 2.5% by volume or more Undersized Particles A: Undersized particles constitute less than 3.0% by number B: Undersized particles constitute 3.0% by number or more and less than 8.0% by number C: Undersized particles constitute 8.0% by number or more Voids The developer is loaded into the developing device of a modified Fuji Xerox ApeosPort-IV C5575 image forming apparatus. After this image forming apparatus is left under 25° C. and 15% RH conditions for a day, a full-page half-tone image with an image density of 5% is printed on 100 sheets of Fuji Xerox's P paper. Then a full-page image with an image density of 100% is printed on a sheet of Fuji Xerox's P paper, and the print is checked for spot-like image defects (so-called voids).

A: No void is observed either visually or under a magnifying glass.

B: No void is observed visually, but minor voids are observed under a magnifying glass.

C: Voids are observed visually.

TABLE 1

| | Production parameters | | | | | | | | Performance testing | | |
|---|---|---|---|---|---|---|---|---|---|---|---|
| | Amount of water in liquid dispersion mixture production Parts by mass | Tip speed of the disperser m/sec | Viscosity during circulation after flocculant addition Pa · s | Viscosity after the end of circulation (viscosity A) Pa · s | Amount of water for viscosity adjustment Parts by mass | Viscosity B Pa · s | Viscosity difference A − B Pa · s | Volume-average diameter of toner particles μm | Oversized particles — | Undersized particles — | Image defects — |
| Comparative Example 1 | 3500 | 40 | 43 | 45 | 0 | 45 | 0 | 5.0 | C | A | C |
| Comparative Example 2 | 5000 | 40 | 29 | 30 | 0 | 30 | 0 | 5.4 | C | C | C |
| Example 1 | 3500 | 40 | 44 | 45 | 1500 | 30 | 15 | 5.0 | A | A | A |
| Example 2 | 2000 | 40 | 72 | 75 | 3000 | 30 | 45 | 4.9 | B | A | B |
| Example 3 | 5000 | 40 | 28 | 30 | 1000 | 20 | 10 | 5.5 | A | B | A |
| Example 4 | 1500 | 40 | 81 | 84 | 3500 | 35 | 49 | 4.9 | B | B | B |
| Example 5 | 5500 | 40 | 25 | 26 | 500 | 20 | 6 | 5.6 | A | B | A |
| Example 6 | 3500 | 30 | 46 | 47 | 1500 | 31 | 16 | 5.3 | B | B | B |
| Example 7 | 3500 | 50 | 44 | 46 | 1500 | 32 | 14 | 4.8 | B | B | A |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a toner for developing an electrostatic charge image, the method comprising:
 mixing at least one flocculant into a liquid dispersion containing binder-resin particles by adding the flocculant into the liquid dispersion containing binder-resin particles while circulating the liquid dispersion containing binder-resin particles between a stirring vessel and a disperser that applies a mechanical shear force;
 forming aggregated particles by heating the liquid dispersion with the flocculant therein after reducing viscosity of the liquid dispersion; and
 forming toner particles by heating the liquid dispersion containing the aggregated particles and thereby making the aggregated particles fuse and coalesce,
 wherein the reducing the viscosity of the liquid dispersion comprises adding water and/or a surfactant to the liquid dispersion after mixing the flocculant.

2. The method according to claim 1 for producing a toner for developing an electrostatic charge image, wherein:
 in the formation of aggregated particles, the viscosity of the liquid dispersion with the flocculant therein is reduced by more than 5 Pa·s and less than 50 Pa·s,
 where the viscosity of the liquid dispersion is viscosity at a shear rate of 1/s measured on a sample of the liquid dispersion at a sample temperature of 25° C.

3. The method according to claim 1 for producing a toner for developing an electrostatic charge image, wherein:
 while the flocculant is being mixed into the liquid dispersion,
  the liquid dispersion has a viscosity of 25 Pa·s or more and 85 Pa·s or less; and
  the disperser that applies a mechanical shear force rotates at a tip speed of 30 m/sec or more and 50 m/sec or less,
 where the viscosity of the liquid dispersion is viscosity at a shear rate of 1/s measured on a sample of the liquid dispersion at a sample temperature of 25° C.

4. The method according to claim 2 for producing a toner for developing an electrostatic charge image, wherein:
 while the flocculant is being mixed into the liquid dispersion,
  the liquid dispersion has a viscosity of 25 Pa·s or more and 85 Pa·s or less; and
  the disperser that applies a mechanical shear force rotates at a tip speed of 30 m/sec or more and 50 m/sec or less,
 where the viscosity of the liquid dispersion is viscosity at a shear rate of 1/s measured on a sample of the liquid dispersion at a sample temperature of 25° C.

5. The method according to claim 1 for producing a toner for developing an electrostatic charge image, wherein the formation of aggregated particles includes adding water to the liquid dispersion with the flocculant therein.

6. The method according to claim 2 for producing a toner for developing an electrostatic charge image, wherein the formation of aggregated particles includes adding water to the liquid dispersion with the flocculant therein.

7. The method according to claim 3 for producing a toner for developing an electrostatic charge image, wherein the formation of aggregated particles includes adding water to the liquid dispersion with the flocculant therein.

8. The method according to claim 4 for producing a toner for developing an electrostatic charge image, wherein the formation of aggregated particles includes adding water to the liquid dispersion with the flocculant therein.

9. The method according to claim 1 for producing a toner for developing an electrostatic charge image, wherein the flocculant includes a trivalent metal salt compound.

10. The method according to claim 2 for producing a toner for developing an electrostatic charge image, wherein the flocculant includes a trivalent metal salt compound.

11. The method according to claim 3 for producing a toner for developing an electrostatic charge image, wherein the flocculant includes a trivalent metal salt compound.

12. The method according to claim 4 for producing a toner for developing an electrostatic charge image, wherein the flocculant includes a trivalent metal salt compound.

13. The method according to claim 5 for producing a toner for developing an electrostatic charge image, wherein the flocculant includes a trivalent metal salt compound.

14. The method according to claim 6 for producing a toner for developing an electrostatic charge image, wherein the flocculant includes a trivalent metal salt compound.

15. The method according to claim 1 for producing a toner for developing an electrostatic charge image, wherein the liquid dispersion containing binder-resin particles contains amorphous polyester resin particles and crystalline polyester resin particles as the binder-resin particles.

16. The method according to claim 1 for producing a toner for developing an electrostatic charge image, wherein the liquid dispersion containing binder-resin particles further contains release-agent particles.

17. The method according to claim 1 for producing a toner for developing an electrostatic charge image, wherein the liquid dispersion containing binder-resin particles further contains coloring-agent particles.

18. The method according to claim 1 for producing a toner for developing an electrostatic charge image, further comprising,
 after the formation of aggregated particles, forming second aggregated particles by mixing the liquid dispersion containing the aggregated particles and at least one liquid dispersion containing shell-layer resin particles together and causing the shell-layer resin particles to aggregate on a surface of the aggregated particles, wherein
 the formation of toner particles is by heating the liquid dispersion containing the second aggregated particles and thereby making the second aggregated particles fuse and coalesce.

19. A toner for developing an electrostatic charge image produced by the method according to claim 1 for producing a toner for developing an electrostatic charge image.

20. An electrostatic charge image developer comprising a toner for developing an electrostatic charge image produced by the method according to claim 1 for producing a toner for developing an electrostatic charge image.

* * * * *